April 15, 1930.                    C. L. LIPMAN                    1,755,009
                       ELECTRICAL MEASURING INSTRUMENT
                       Filed May 12, 1927          4 Sheets-Sheet 1
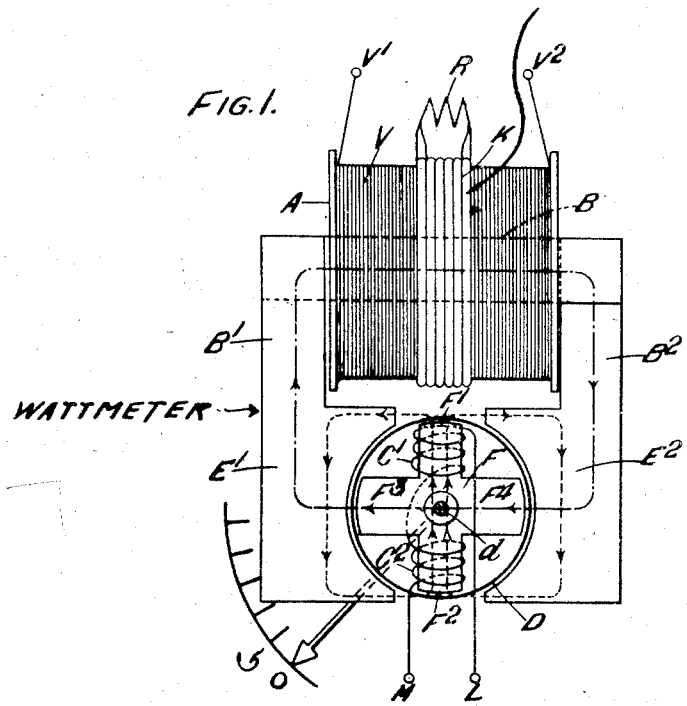
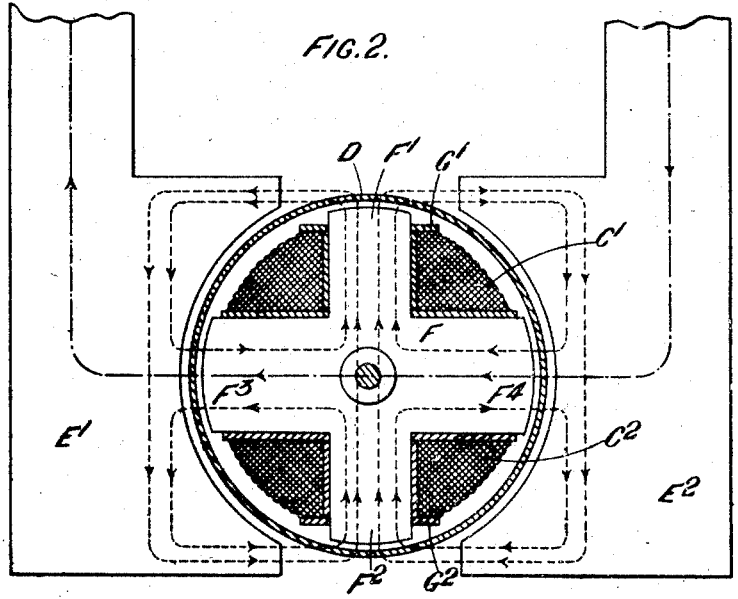
Inventor
Chmoul L. Lipman
By
           Attorney

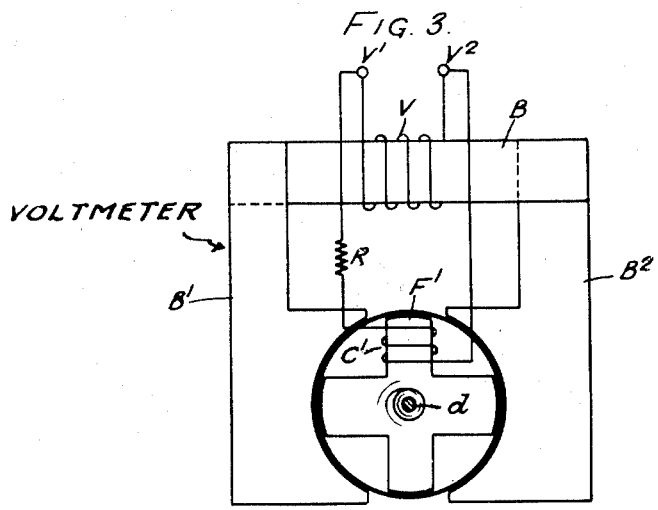
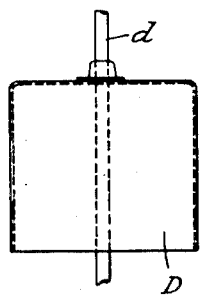
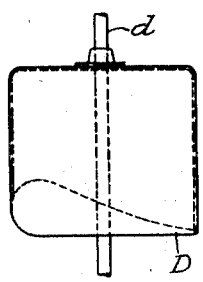

April 15, 1930.  C. L. LIPMAN  1,755,009
ELECTRICAL MEASURING INSTRUMENT
Filed May 12, 1927  4 Sheets-Sheet 3
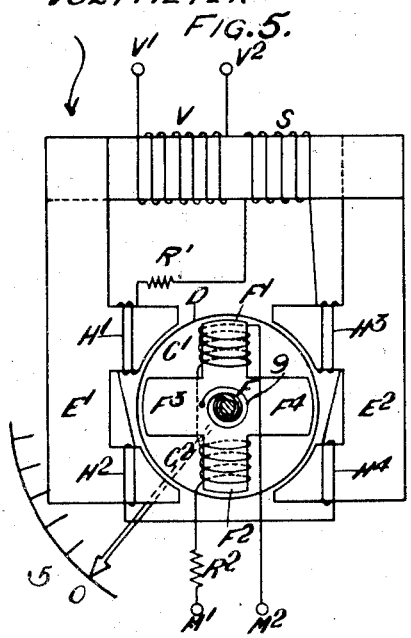
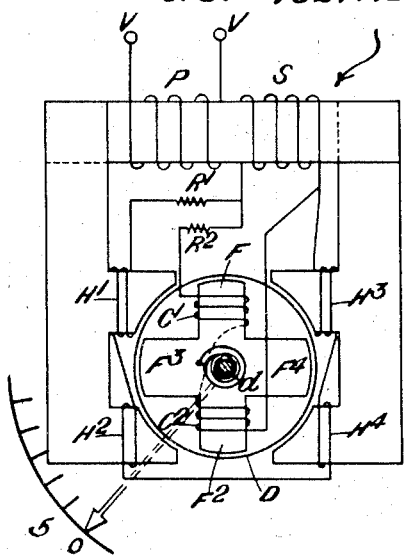
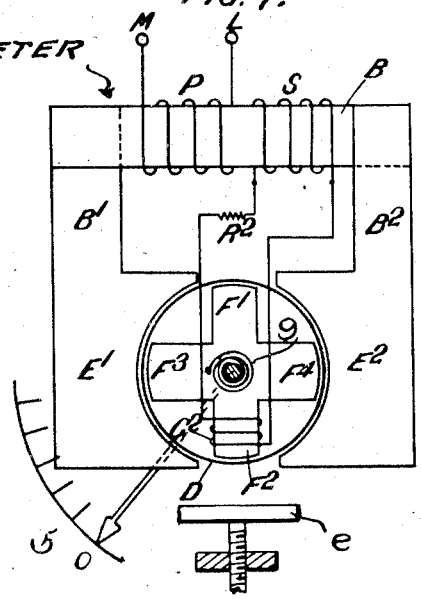
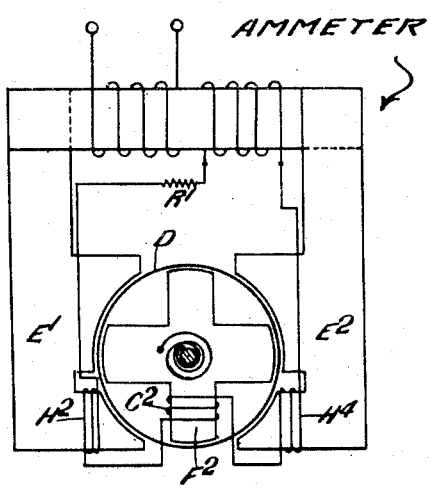
Inventor
Chmoul L. Lipman
By
Attorney

AMMETER

OVER AND UNDER CURRENT OR VOLT RELAY

Patented Apr. 15, 1930

1,755,009

UNITED STATES PATENT OFFICE

CHMOUL LEIB LIPMAN, OF LONDON, ENGLAND, ASSIGNOR OF A PART INTEREST TO NALDER BROTHERS & THOMPSON LIMITED, OF LONDON, ENGLAND

ELECTRICAL MEASURING INSTRUMENT

Application filed May 12, 1927, Serial No. 190,948, and in Great Britain May 20, 1926.

The invention relates to electric alternating current indicating, recording and integrating instruments and relays of the induction type in which a hollow cylindrical drum is capable of rotation in the air gap formed between a fixed laminated iron core placed inside the drum and the pole pieces of the laminated iron circuit of an electromagnet.

According to the invention, a main energizing winding is provided on the outer laminated core of the electromagnet and one or more supplementary windings are provided on polar projections of the inner core symmetrically arranged with respect to the polar surfaces of the outer core or on both inner and outer cores, in order to produce a field or fields, which is or are displaced, both in space direction and time phase, relatively to that of the main winding, while other unwound or wound projections of the inner core reduce or increase the magnetic reluctance of the main field path.

The construction of the instruments is preferably such that all the windings are easily removable and exchangeable.

The polar projections of the inner core are symmetrically arranged and approach close to the internal surface of the drum; the projections are preferably, but not necessarily, in the form of a cross, windings being provided in the latter case on one or both of the projections having a common axis, while the projections at right angles to these are usually unwound and their axis passes through the centre of the polar surfaces of the outer core. The wound projections of the inner core may be of smaller cross section than that of the unwound projections in order to lessen the inductance of the circuit of the supplementary windings, and in special cases the flux density is near the saturation point for currents of comparatively low strength.

The instrument may with suitable modifications in the windings be used as an ammeter, voltmeter or wattmeter, a differential or paralleling voltmeter, or as an over or under current or volt relay.

In the case of a polyphase instrument two or three such electromagnetic elements are arranged to act on a common moving system.

A further object of the invention is to provide an instrument in which the effects of changes of temperature or changes of frequency of the current are compensated or substantially reduced.

A further object is to provide means by which the range of the instrument or its sensitiveness can be controlled.

A further object is to provide means by which the phase relation between the field produced by the main energizing winding and the field produced by the supplementary winding or windings on the inner core may be adjusted.

The accompanying drawings illustrate diagrammatically examples of electrical instruments and relays according to the invention.

Fig. 1 represents a single phase wattmeter and

Fig. 2 shows on a larger scale the poles of the inner and outer core of the horseshoe shaped electromagnet.

Fig. 3 shows a voltmeter or over or under volt relay according to the invention.

Fig. 4 illustrates the form of drum or cylindrical rotor adapted to be used for most of the instruments described.

Fig. 5 shows a differential voltmeter for use on a polyphase or single phase 3 wire system for balancing or regulating purposes.

Fig. 6 shows a voltmeter which is practically independent of errors due to variations of temperature.

Figs. 7 and 8 show preferred constructions of ammeters or over or under current relays.

Fig. 9 illustrates a preferred form of shaped drum or rotor used in conjunction with an ammeter.

Figure 10:
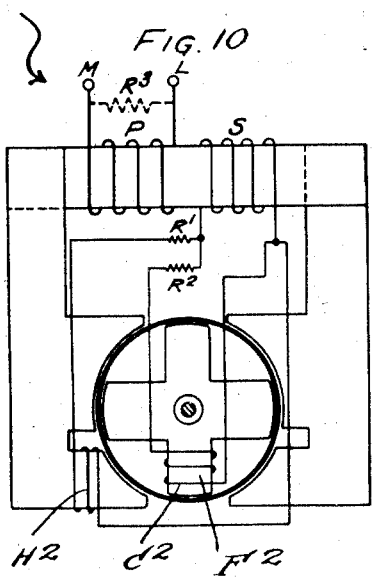
Fig. 10 shows a modified form of ammeter which is practically free from errors due to changes in temperature.

Referring to Figs. 1 and 2, $V^1$, $V^2$ are the terminals of the potential winding V of a single phase wattmeter; the windings are wound on a bobbin A placed on the yoke B of the laminated magnetic core B, $B^1$, $B^2$ of an electromagnet. The yoke B is formed separately from the limbs $B^1$, $B^2$, so that the yoke with the bobbin can be inserted in position between these limbs. A hollow cylindrical drum D, preferably of thin aluminium or copper, is mounted on a pivoted spindle shown in section at $d$ and is adapted to be set into rotational movement between the poles $E^1$, $E^2$ of the electromagnet. The magnetic circuit is completed by an inner core F, which in the example illustrated is of cruciform shape, placed symmetrically with respect to the poles $E^1$, $E^2$ of the electromagnet and coaxial with the drum D.

In the construction illustrated, the axis of the two polar projections $F^3$, $F^4$ is in line with the central portions of the external poles $E^1$, $E^2$, thus providing a magnetic path of reduced reluctance for the main flux.

Bobbins $G^1$, $G^2$, shown in section in Fig. 2, are placed on the poles $F^1$, $F^2$ of the core F and contain a few turns of wire $C^1$, $C^2$ connected to the current terminals M, L of the load circuit. The bobbins $G^1$, $G^2$ may be omitted if the coils $C^1$, $C^2$ are suitably wrapped with insulating material.

The windings $C^1$, $C^2$ may be connected in series or in parallel or in opposition, or in some cases one of these windings may be omitted.

The core F is built up of laminated plates of magnetic material; the polar projections may take any required form, and the cross-section of the parts $F^1$, $F^2$ on which the current windings are mounted is, preferably, considerably less than that of the parts $F^3$, $F^4$ which are in line with the poles $E^1$, $E^2$.

The main magnetizing winding V produces a flux shown by the chain dotted lines, and the windings $C^1$, $C^2$ produce a flux shown by the broken lines, these two fluxes are at right angles where they traverse the drum D.

Since the potential winding V consists of a large number of turns and the magnetic reluctance of its circuit is very small, there is a considerable inductance and time-phase lag in this circuit, whereas in the circuit of the current windings $C^1$, $C^2$, owing to the small number of turns and the reduced section of the parts of the core on which they are wound and the comparatively large air gaps between the poles $F^1$, $F^2$ and the poles $E^1$, $E^2$, the inductance is small and consequently the flux due to the current coils is practically in phase with the current producing it.

An auxiliary winding K short circuited on itself or through a resistance R may be placed in known manner at any part of the magnetic path B, $B^1$, $B^2$ or according to the invention on the internal poles $F^3$, $F^4$ in order to make the angle between the two fluxes exactly equal to 90°, thus ensuring a perfectly uniform resultant rotating field which tends to rotate the drum D in a given direction against an opposing torque such as that of a spring.

The torque exerted on the moving members can be adjusted in a simple manner by means of a magnetic shunt, consisting of a strip $e$ (Fig. 7) of magnetic material of suitable dimensions placed near to the poles $E^1$, $E^2$ of the electromagnet in order to divert a portion of the lines of magnetic force. This is useful in equalizing the torque due to the elements of a polyphase instrument.

In Fig. 3, which illustrates the instrument constructed in its simplest form as a voltmeter, the coil $C^1$ is of fine wire and is connected in series with a high non-inductive resistance R and in shunt with the highly inductive winding V across the terminals $V^1$, $V^2$ of the instrument. The same construction can be used as an over or under volt relay with the addition of suitable contacts and the like.

Fig. 5 illustrates a differential voltmeter for indicating, for example, whether the voltage of one portion of a polyphase system is equal to or is above or below that of another portion of the same system. Coils $H^1$, $H^2$, $H^3$, $H^4$ are placed on suitable projections or pole shoes of the poles $E^1$, $E^2$ close to the drum and are energized through a non-inductive resistance $R^1$ from the secondary winding S of a transforming device, the primary winding of which is V. The coil V is connected to the terminals $V^1$, $V^2$ which are connected across one portion or phase of a polyphase system either directly or through a potential transformer. The electrical connections are such that the resultant rotating field due to the windings V and $H^1$, $H^2$, $H^3$, $H^4$ exerts a torque in a given direction upon the moving system, for example in the anticlockwise direction.

The coils $C^1$, $C^2$ mounted on the poles $F^1$, $F^2$ of the inner core, are connected in series with a suitable impedance $R^2$ across terminals $M^1$, $M^2$ which are connected across another portion of a polyphase system, the voltage of which it is desired to compare with that between $V^1$ and $V^2$.

The electrical connections are such that the resultant rotating field due to the coils V and $C^1$, $C^2$ exerts a torque on the drum in the opposite direction to that of the field due to the coils V and $H^1$, $H^2$, $H^3$, $H^4$.

It is obvious that when all the windings are energized simultaneously a pointer connected to the drum D will give readings proportional to the difference in volts between the two sources of voltage.

The moving system is preferably controlled by a hair spring $g$ which is arranged to indicate a zero reading at the centre of the scale.

The electrical circuits can be so adjusted that, when equal volts are applied to the terminals $V^1$, $V^2$, and $M^1$, $M^2$ respectively, the opposing magnetic fields will also tend to set the pointer at the centre of the scale.

The windings V and S are shown in Fig. 5 side by side, but in practice they are preferably wound concentrically.

It will be understood that it is within the scope of the invention to employ additional windings and to place them on the ends $F^3$, $F^4$ of the core F, and to arrange the electrical constants of their circuit so as to produce a flux bearing any desired time-phase relation to that produced by the remaining coils.

In Fig. 6 which illustrates the construction of a voltmeter that is practically independent of errors due to variations of temperature, the coils $C^1$, $C^2$ in series with a resistance $R^2$ are connected across the secondary winding S to which the coils $H^1$, $H^2$, $H^3$, $H^4$ and resistance $R^1$ are also connected.

The action of the windings is differential and similar to that described with reference to Fig. 5, except that the total ampere turns of the compensating coils $H^1$, $H^2$, $H^3$, $H^4$ are only a small percentage of those of the principal coils $C^1$, $C^2$ and that the instrument is provided with a zero at one end of the scale and two terminals only.

In order to render the instrument free from temperature errors, due either to external or internal effects, the windings of the coils $H^1$—$H^4$ and $C^1$—$C^2$ may be, as usual, of copper and the resistance $R^1$ wholly or partially of copper or of other material in which the resistance is relatively largely affected by temperature, the resistance $R^2$ on the other hand consists of a material having a very small or negligible temperature resistance coefficient, such as the high resistance alloy of copper and nickel known as "Eureka".

The resultant action depends upon the difference between the effect due to the coils $C^1$, $C^2$ and that due to the coils $H^1$—$H^4$ of which that of the latter is smaller than and opposed to the former.

If the temperature rises, the resistance of both coils will be increased and the currents in them reduced and, omitting the effect of the resistances $R^1$, $R^2$ in the same ratio. If the action of both coils is reduced in the same ratio, the resultant effect will be similarly reduced and to maintain it at a constant value it is necessary to reduce the opposing force due to the coils $H^1$—$H^2$ in a greater ratio than the force due to the coils $C^1$, $C^2$. This is effected by the use of a material for the resistance $R^1$ which is more affected by temperature than the material of the resistance $R^2$. The values of the resistances $R^1$, $R^2$ are determined empirically by suitable trials.

In Fig. 7, which represents a simple form of construction of an ammeter, the coil $C^2$ on the pole $F^2$ of the inner core F is connected to the secondary winding S of the main electromagnet either directly or in series with a resistance $R^2$. The primary winding P is connected in the external load circuit either directly or through a current transformer.

Fig. 8 illustrates an alternative construction of an ammeter which is similar to that of Fig. 7 except that supplementary coils $H^2$, $H^4$ are added on the lower pole shoes of the poles $E^1$, $E^2$. The polarity of the coils $C^2$, $H^2$, $H^4$ is such that they assist one another and produce a common flux the intensity of which is greatest in the region of the wound poles.

This concentration of flux at a particular part of the magnetic system is advantageous when used in conjunction with a suitably shaped or slotted rotor, the combination tending to give a uniform scale of deflections on an instrument, the operating forces of which are proportional to the square or other power of the quantity to be measured.

An ammeter constructed in accordance with Figs. 7 or 8 will indicate accurately independently of the frequency of the alternations.

Since the torque on the drum D is proportional to the product of the main magnetic flux, frequency and current in the secondary circuit in the coil $C^2$, or coils $C^2$, $H^2$, $H^4$, the force exerted upon the drum with any given current through the primary P remains constant for any frequency, since a change of frequency will vary the main flux in the inverse ratio and the secondary current is practically the same at all frequencies for a given primary current, and hence the product of the three quantities remains constant.

The primary and secondary windings form a transformer in which consequently the secondary current bears a constant ratio to the primary current. For a given value of the primary current, the secondary current will have a constant value, but as the resistance of the primary circuit is practically negligible compared with its inductance, the main field is reduced in the ratio of the change of frequency.

The constructions shown in Figs. 7 and 8 illustrated also the invention as applied to an over or under current relay.

Fig. 10 illustrates an ammeter which is compensated against errors due to changes in temperature and is similar in its mode of action to that shown in Fig. 6.

The principal system consists of a coil $C^2$ on the pole $F^2$ which is energized from the secondary winding S either directly or in series with a resistance $R^2$. The compensating system in the example illustrated consists of a coil $H^2$ on the lower left hand pole shoe in series with a suitable series resistance $R^1$. The compensating system is shown in Fig. 10 as connected in parallel with the windings on the internal core, but, alternatively, it could also be energized directly from the terminals M, L in shunt with the primary coil P of the electromagnet.

In some cases an additional compensating resistance $R^3$, the material of which has the required temperature (resistance) coefficient, may also be placed in shunt with the primary winding P.

As in Fig. 6 the two system of supplementary windings act in opposition to one another and the torque due to the principal coil C² considerably exceeds that due to coil H², whereas the materials for these windings are so selected and proportioned with respect to their temperature resistance cofficients that changes of temperature affect the two systems equally, thus neutralizing any errors due to this cause, independently of the characteristics of the current to be measured.

Figure 11:
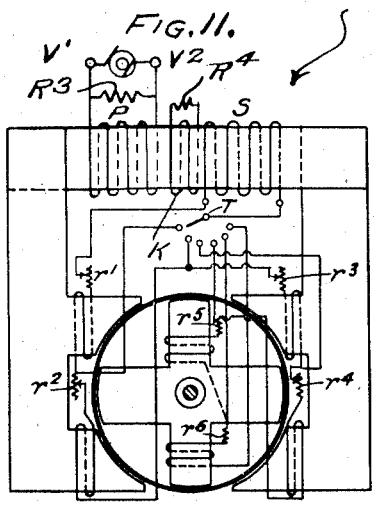
Fig. 11 represents a modification of the invention as applied to over or under current or volt relays.

In Fig. 11 which is generally similar to Fig. 8 an additional switch or plug connector T is provided whereby any desired number of supplementary coils may be energized from the winding S. By means of this a large number of ranges can conveniently be provided in one instrument. Suitable resistances $r^1$—$r^6$ may be included for calibration purposes in each winding.

Having thus described the nature of the said invention and the best means I know of carrying the same into practical effect, I claim:—

1. An electric alternating current instrument comprising an electromagnet, a laminated core for said magnet, a main energizing winding on the said core, symmetrically disposed polar surfaces on said magnet, a drum of electric conducting material adapted to be rotated through an arc between said polar surfaces, a fixed inner core of magnetic material within said drum, polar projections on said inner core and a winding on one of said polar projections of said inner core extending close to the inner periphery of said drum arranged and connected to produce a magnetic field in said polar surfaces substantially at right angles in time phase and space direction to that produced therein by the said main magnetizing winding.

2. An electric alternating current instrument according to claim 1, in which the projections of the inner core are of cruciform shape and two of said projections are disposed in the axis of said polar surfaces.

3. An electric alternating current instrument according to claim 1, in which a supplementary winding is provided on the projection of the inner core on the same axial line as the first-named projection, the supplementary windings being connected in series and energized inductively from said energizing winding.

4. An electric alternating current instrument according to claim 1, in which a closed winding is provided on the core of the said magnet and an adjutsable resistance is inserted in said winding in order to adjust the phase relation between the main and supplementary magnetic fluxes.

5. An electric alternating current instrument according to claim 1, in which a pole shoe is provided eccentric to the axis of the polar surfaces and a supplementary winding thereon is inductively energized from said main energizing winding.

6. An electric alternating current instrument according to claim 1, in which a pole shoe is provided eccentric to the axis of the polar surfaces and a supplementary winding on said pole shoe is inductively energized from the main energizing winding, and resistances of suitable materials are inserted in said supplementary windings in parallel with the main energizing winding in order to compensate effects due to changes of frequency and temperature.

7. An electric alternating current instrument according to claim 1, in which a pair of pole shoes is provided on each polar surface eccentric to the axis of the said surfaces, and supplementary windings on said shoes are connected in series with the said supplementary windings on the inner core and energized inductively from the main energizing winding.

8. An electric alternating current instrument comprising a horseshoe shaped electromagnet, a laminated core for said magnet, a source of alternating current, a main energizing winding on the said core connected to said source, a secondary winding energized from said main winding, two symmetrically disposed polar surfaces on said core, a drum of electric conducting material adapted to be rotated through an arc between said polar surfaces, a fixed inner core of magnetic material having four rectangularly disposed projections, the axes of two of said projections lying in the direction of the axis of the said polar surfaces, supplementary windings on the projections at right angles to the said axis, a pair of pole shoes on each polar surface, eccentrically disposed to said axis, supplementary windings on said pole shoes, all said supplementary windings being adapted to be connected in series with said secondary winding.

9. An electric alternating current instrument comprising a horesshoe shapel electromagnet, a laminated core for said magnet, a source of alternating current, a main energizing winding on the said core connected to said source, a secondary winding energized from said main winding, two symmetrically disposed polar surfaces on said core, a drum of electric conducting material adapted to be rotated through an arc between said polar surfaces, a fixed inner core of magnetic material having four rectangularly disposed projections, the axes of two of said projections lying in the direction of the axis of the said polar surfaces, supplementary windings on the projections at right angles to the said axis, a pair of pole shoes on each polar surface, eccentrically disposed to said axis, supplementary windings on said pole shoes, and means including a movable contact arm for connecting any required sets of supplementary windings in series to said secondary winding.

10. An electric alternating current instrument comprising a horseshoe shaped electromagnet, a laminated core for said magnet, a source of alternating current, a main energizing winding on the said core connected to said source, a secondary winding energized from said main winding, two symmetrically disposed polar surfaces on said core, a drum of electric conducting material adapted to be rotated through an arc between said polar surfaces, a fixed inner core of magnetic material having four rectangularly disposed projections, the axes of two of said projections lying in the direction of the axis of the said polar surfaces, supplementary windings on the projections at right angles to the said axis, a pair of pole shoes on each polar surface, eccentrically disposed to said axis, supplementary windings on said pole shoes, all said supplementary windings being adapted to be connected in series with said secondary winding and means by which effects due to changes of frequency and temperature can be compensated.

11. An electric alternating current instrument comprising a horseshoe shaped electromagnet, a laminated core for said magnet, a source of alternating current, a main energizing winding on the said core connected to said source, a secondary winding energized from said main winding, two symmetrically disposed polar surfaces on said core, a drum of electric conducting material adapted to be rotated through an arc between said polar surfaces, a fixed inner core of magnetic material having four rectangularly disposed projections, the axes of two of said projections lying in the direction of the axis of the said polar surfaces, supplementary windings on the projections at right angles to the said axis, a pair of pole shoes on each polar surface, eccentrically disposed to said axis, supplementary windings on said pole shoes, all said supplementary windings being adapted to be connected in series to said secondary winding, and means by which the angular relation between the magnetic fluxes due respectively to the main and supplementary windings can be adjusted.

In testimony whereof I have signed my name to this specification.

CHMOUL LEIB LIPMAN.